Dec. 23, 1924.
E. B. VAUGHAN
1,520,457
CONFECTION BAKING APPARATUS
Filed May 19, 1923
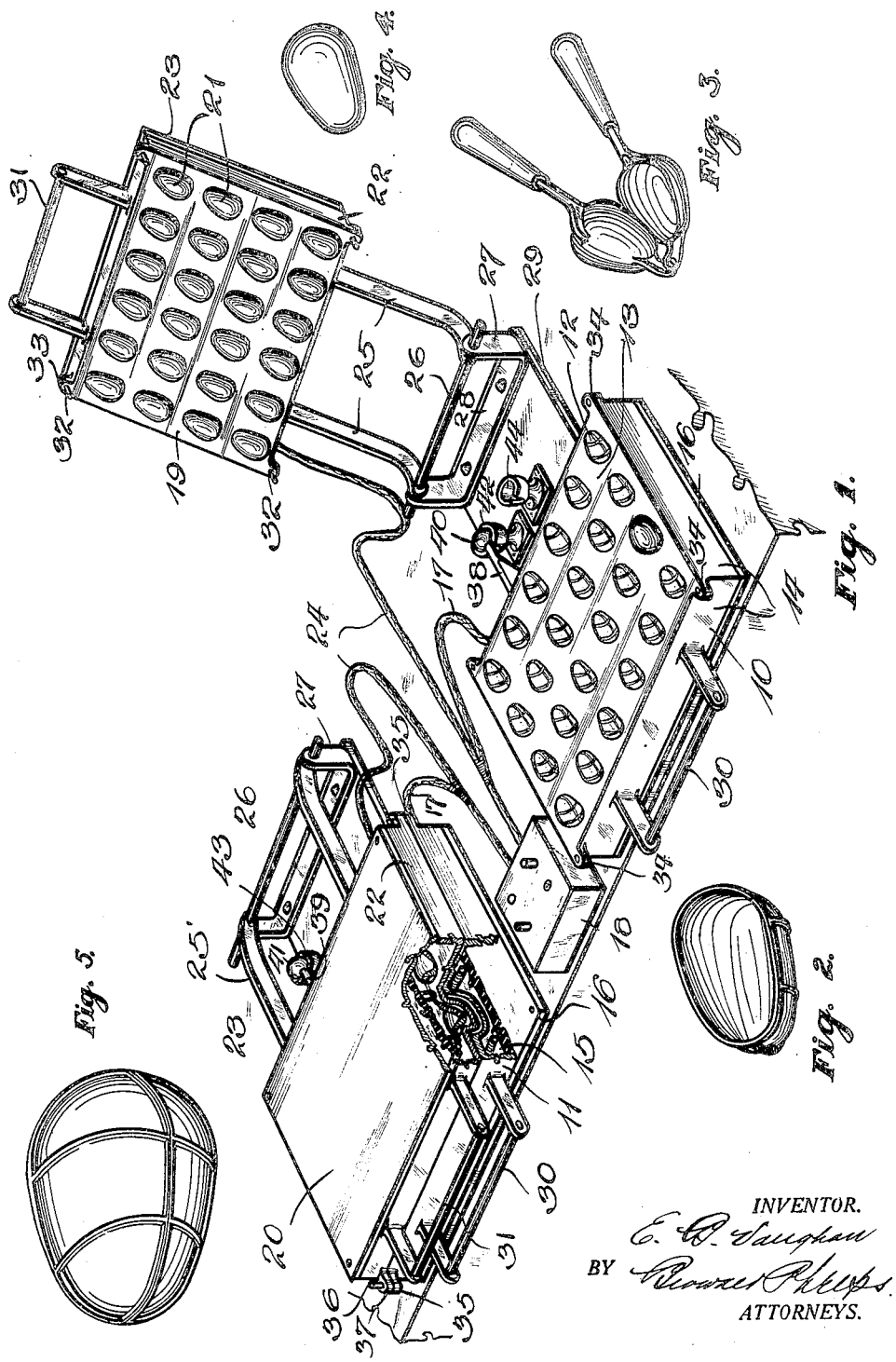
INVENTOR.
E. B. Vaughan
BY Beazer Phelps
ATTORNEYS.

Patented Dec. 23, 1924.

1,520,457

UNITED STATES PATENT OFFICE.

EARNEY B. VAUGHAN, OF LONG BEACH, CALIFORNIA.

CONFECTION-BAKING APPARATUS.

Application filed May 19, 1923. Serial No. 640,119.

*To all whom it may concern:*

Be it known that I, EARNEY B. VAUGHAN, citizen of the United States, residing at Long Beach, in the county of Los Angeles and State of California, have invented certain new and useful Improvements in Confection-Baking Apparatus, of which the following is a specification.

The invention relates to the making of confection and has as an object the provision of a device for making a confection of ice cream or ice, covered with a baked envelope.

Further objects of the invention will appear in connection with the following description when read with the accompanying drawings showing an illustrative embodiment of the invention and wherein:

Fig. 1 is a perspective view partly broken away of a complete apparatus,

Fig. 2 is a perspective view of one half of a shell.

Figure 3 is a perspective view of a mold for the center.

Fig. 4 is a side elevation of the molded center, and,

Fig. 5 is a perspective view of the finished article to be produced by the apparatus of the invention.

As shown in Figure 1 the apparatus comprises a pair of similar members 10, 11, each having therein a plurality of cavities 12 shaped to form one half of the exterior surface of the article to be produced. The cavities in the two members 10, 11 are so situated as to register when the members are superposed.

Each of the members 10 is shown as comprising a cavity carrying plate 13, edges 14 united to the plate 13 and providing a recess 15 back of the plate 13. To close the recess 15 there is shown a cover plate 16 suitably secured to each of the members. Suitable electric heating elements are located in the recess 15 and are supplied with current by means of cables 17 leading to a switch box 18.

To mold the material placed in the cavities 12 so as to produce a hollow to receive the molded frozen confection there are shown mold carrying plates 19, 20 having thereon projections 21 adapted to enter the cavities 12 when the members 19, 20 are superposed upon the members 10, 11.

The mold carrying members 19, 20 are provided with recess-forming sides 22 having cover plates 23 secured thereto and electric heating elements are provided in the members 19, 20 supplied with current by means of cables 24.

To enable the members 19, 20 to be readily superposed upon the members 10, 11, arms 25 are shown projecting from the said members and journaled upon shafts 26 which shafts are journaled in standards 27 carried by a strap 28 mounted upon a plate 29 projecting rearwardly from the members 10, 11.

Handles 30, 31 are provided upon the members 10, 11 and 19, 20 for convenience in manipulating the apparatus.

To insure that the member 19 registers properly with the member 10 there are shown pins 32 fixed in and projecting from ears 33 which pins are adapted to enter openings in other ears 34 carried by the member 10.

The mode of operation of the device is as follows: Batter of a suitable nature is placed in the cavities 12 in sufficient quantity to coat the cavity to a thickness equaling the clearance between the surfaces of the cavities and the mould projections 21. The cavities in both the members 10, 11 are supplied at the same time and the members 19, 20 are thereupon closed down upon the first named members so as to cause the batter to take the form of the cavity. Each of the members 10, 11 and 19, 20 are heated to baking temperature before the introduction of the batter. Before the batter has become baked to a greater extent than is necessary to cause it to retain its form the members 19, 20 are swung to the position shown at the right in Figure 2 and, by means of the mould shown in Figure 3, a center filling is formed of the desired material as for instance ice cream, one such article being placed in each lined cavity of member 10. The member 11 is next transferred to the position in registry with member 10, when, the batter being still pasty, the linings of the two cavities will unite at their edges. The heat is thereupon continued at such a temperature as to very quickly bake the batter without bad effect upon the frozen center when the finished product is promptly removed and may be placed in cold storage.

To insure registry between the members 10 and 11 the ears 35 upon the member 11 are provided with pins 36 corresponding to pins 32 on member 19 and the ears 37 upon member 20 are perforated to seat over the pins while the batter is being molded.

To hold the members 10 and 11 in their initial position there are shown arms 38, 39 projecting from the sides thereof and terminating in balls 40, 41, which balls are adapted to seat in sockets 42, 43. The arms 38, 39 are off center. To receive the ball 41 when the member 11 is superposed upon the member 10 a socket 44 is placed upon the other side of the center of member 10 in the proper position to receive the ball 41 when inverted.

Minor changes may be made in the physical embodiment of the invention without departing from its spirit.

I claim:

1. Confection forming apparatus, comprising, in combination, a pair of plates having corresponding mould cavities therein, a pair of plates having moulds thereon adapted to enter and to be spaced from said cavities, means to bring the cavities in one of said plates in register with the cavity in the other of said plates when the two are superposed and means to heat said plates.

2. Confection forming apparatus, comprising, in combination, a pair of plates having corresponding cavities therein, a pair of plates hinged adjacent said first named plates, moulds upon said second named plates adapted to enter said cavities when said plates are superposed, means to bring the cavities upon said plates in registry when the cavity carrying plates are superposed, an arm projecting from each of said plates at one side of the median line thereof, means coacting with said arms to position the plates to receive said hinged plates, means adjacent one of said plates at the other side of its median line to receive the positioning means of the second cavity carrying plate when inverted over the first named cavity carrying plate and means for heating each of said plates.

3. Confection forming apparatus comprising, in combination, a pair of like plates having each a series of cavities therein, an arm projecting from a side of one of said plates at one side of the center thereof, a socket adapted to receive the end of said arm for accurate location of the plate, a socket at the other side of the center of the other of said plates to receive the locating arm upon the first named plate when inverted and superposed upon the second named plate, and means to heat said plates.

EARNEY B. VAUGHAN.